United States Patent [19]
Greaves et al.

[11] Patent Number: 5,820,221
[45] Date of Patent: Oct. 13, 1998

[54] FOLDABLE SEAT HAVING REMOVABLE PANELS

[75] Inventors: Mikal B. Greaves, Seattle; Charles K. Lau, Bellevue; Mark A. McLean, Kirkland; William C. Quan, Newcastle; Ferdinand J. Van Engelen, Redmond; Michelle J. Pillers, Kirkland; Kevin J. Talbot, Mercer Island, all of Wash.

[73] Assignee: Tempress, Inc., Seattle, Wash.

[21] Appl. No.: 719,327

[22] Filed: Sep. 25, 1996

[51] Int. Cl.⁶ .................................................. B60N 2/02
[52] U.S. Cl. .................... 297/378.14; 297/440.2; 297/440.22
[58] Field of Search ............................ 297/378.12, 378.1, 297/378.14, 440.2, 440.22, 440.1

[56] References Cited

U.S. PATENT DOCUMENTS

| | | |
|---|---|---|
| D. 183,233 | 7/1958 | Ahrens . |
| D. 303,878 | 10/1989 | Goldsmith . |
| D. 337,445 | 7/1993 | Sando . |
| D. 355,779 | 2/1995 | Tribelsky . |
| 1,397,675 | 11/1921 | Buske ............................ 297/440.22 X |
| 1,467,582 | 9/1923 | Lang ............................ 297/440.22 X |
| 2,536,157 | 1/1951 | Campanelli . |
| 3,131,970 | 5/1964 | McGregor . |
| 3,245,717 | 4/1966 | Levy . |
| 3,409,325 | 11/1968 | Hamilton et al. . |
| 3,848,921 | 11/1974 | Rhodes . |
| 3,886,611 | 6/1975 | Lammy et al. . |
| 3,936,907 | 2/1976 | Jansons . |
| 4,099,774 | 7/1978 | Sandham . |
| 4,383,488 | 5/1983 | Macho et al. . |
| 4,428,617 | 1/1984 | Lawson . |
| 4,488,755 | 12/1984 | Nemschoff ................... 297/440.22 X |
| 4,775,187 | 10/1988 | Herr . |
| 4,869,551 | 9/1989 | Lathers . |
| 4,871,209 | 10/1989 | Handelman . |
| 4,926,783 | 5/1990 | Lathers . |
| 4,934,303 | 6/1990 | Lathers et al. . |
| 4,945,853 | 8/1990 | Lathers . |
| 5,018,788 | 5/1991 | Cedergreen . |
| 5,052,076 | 10/1991 | Spaeth . |
| 5,094,505 | 3/1992 | Nichols . |
| 5,110,186 | 5/1992 | Clark et al. ................... 297/440.22 X |
| 5,197,406 | 3/1993 | Rabal et al. . |
| 5,353,734 | 10/1994 | Tani . |
| 5,423,280 | 6/1995 | Kelley . |
| 5,460,426 | 10/1995 | Tribelsky et al. . |
| 5,463,972 | 11/1995 | Gezari et al. . |

*Primary Examiner*—Milton Nelson, Jr.
*Attorney, Agent, or Firm*—Christensen O'Connor Johnson & Kindness PLLC

[57] ABSTRACT

A seat (10) is disclosed that includes a seat back (14) hingedly attached to a seat base (12) such that the seat back can be folded from an upright, vertical position to a closed, horizontal position with the lower surface of the seat back overlying the upper surface of the seat base throughout the seat's range of motion. For ready upholstering, in one embodiment, the foldable seat includes a removable seat base panel (20) and a removable seat back panel (22) attached to the seat base and back, respectively.

23 Claims, 6 Drawing Sheets

FOLDABLE SEAT HAVING REMOVABLE PANELS

FIELD OF THE INVENTION

The present invention relates to a foldable seat, particularly to a foldable seat having removable panels.

BACKGROUND OF THE INVENTION

Durability, comfort, and compactness are a few of the desirable characteristics of popular and useful seats including lawn and garden seats, seats found on lawn, garden, and agricultural equipment, wheelchairs, golfcarts, and marine vessels such as recreational and fishing boats. Seat durability results primarily from the design and materials used in the seat's construction. Key factors in seat comfort include design and cushioning. Compactness is often the single most significant concern for a marine seat because space, particularly deck space, is generally limited on most marine vessels.

Seats generally fall into the broad categories of compact and uncomfortable, or large and comfortable. Where space is not an issue and comfort is desired, the seat of choice is an upholstered one. However, in many instances, the utilitarian aspects of a seat dictate its compactness, forgoing its comfort.

The problem of marine seat compactness is at least partially solved when the seat is stowable, i.e., removable from its location on, for example, the deck of a boat. However, stowing a seat necessarily means that the seat is relatively unavailable for use and, perhaps more importantly, must be stored elsewhere on the boat. As an alternative to stowable seats, foldable seats offer the advantage that they may be compacted by folding in place when not in use, and thus do not require storage. However, folding seats have relatively hard surfaces and are generally uncomfortable to sit in for any length of time.

A common remedy is to place or temporarily attach a cushion to the horizontal surface of the seat to render it more comfortable. Oftentimes such cushions are ill-fitting and typically do not afford the comfort that an upholstered seat provides. Furthermore, many folding seats unfold into an upright position with the seat back portion moving into contact with the seat base portion. Such foldable seats are disadvantageous for safety reasons, as it is not uncommon for a finger or hand to be pinched between these foldable parts.

While one drawback to the application of upholstery to a foldable seat inevitably lies with balancing the comfort associated with bulkiness of upholstery and the compactness of a foldable seat, perhaps the greatest disadvantage results from the difficulty associated with the process of upholstering a foldable seat. Unlike a traditional static seat, a foldable seat is by its nature relatively dynamic and flexible. Consequently, upholstering a foldable seat requires additional labor skill and time, which are ultimately reflected in the product's cost. The general difficulty of upholstering a foldable seat coupled with the fact that the seat is fixed, such as on a marine vessel, further adds to the complexity of maintaining and inevitably repairing an upholstered seat.

Accordingly, there exists a need for a durable, affordable, easily manufactured and repaired seat that offers the advantages of compactness of a foldable seat without the safety concerns of traditional foldable seats and the comfort and aesthetic advantages of an upholstered seat. The present invention seeks to fulfill these needs and provides further related advantages.

SUMMARY OF THE INVENTION

In one aspect, a seat formed in accordance with the present invention includes a seat back that is attached to a seat base and has a removable seat back panel and/or a removable seat base panel.

In another aspect, a seat formed in accordance with the present invention includes a seat back that is hingedly attached to a seat base and, optionally, a removable seat back panel and/or a removable base panel. The seat is designed so that the seat base and back panels are easily removed from and attached to the seat. The removable panels are readily upholstered and can be attached directly to the seat to provide an upholstered seat. A seat of the present invention is also designed such that the seat back and seat base overlie one another at least partially throughout the entire range of motion of the foldable seat. Such a continuous overlay avoids the possibility of pinching a finger or hand when unfolding the seat of the present invention.

The seat includes a simple design that can be easily manufactured from inexpensive, weather-resistant materials. Because the seat can be made from materials that are weather resistant, the seat is particularly useful on boats and in other harsh environments including high-use and outdoor environments.

In one embodiment, a seat formed in accordance with the present invention includes a seat base and a seat back that are hingedly attached. The seat base can be fixedly attached to a support or surface that holds the seat base in a substantially horizontal position. The seat back is displaceable between a horizontal folded and a vertical upright position. In its vertical position, the seat back includes a substantially vertical surface and a downwardly and forwardly extending lower wall having a forward facing surface. The seat base includes a substantially horizontal surface and an upwardly extending back wall having a rear facing surface. When the seat back is in its vertical, upright position, the forward facing surface of the seat back's lower wall substantially fully overlies the rear facing surface of the seat base's back wall. When the seat back is in its horizontal, folded position, the forward facing surface partially overlies the rear facing surface.

The seat of the invention includes a means for securing the seat back in a folded, horizontal position. The seat also includes a means for interlocking the seat back and seat base for preventing the seat back from buckling and deflecting past the vertical upright position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
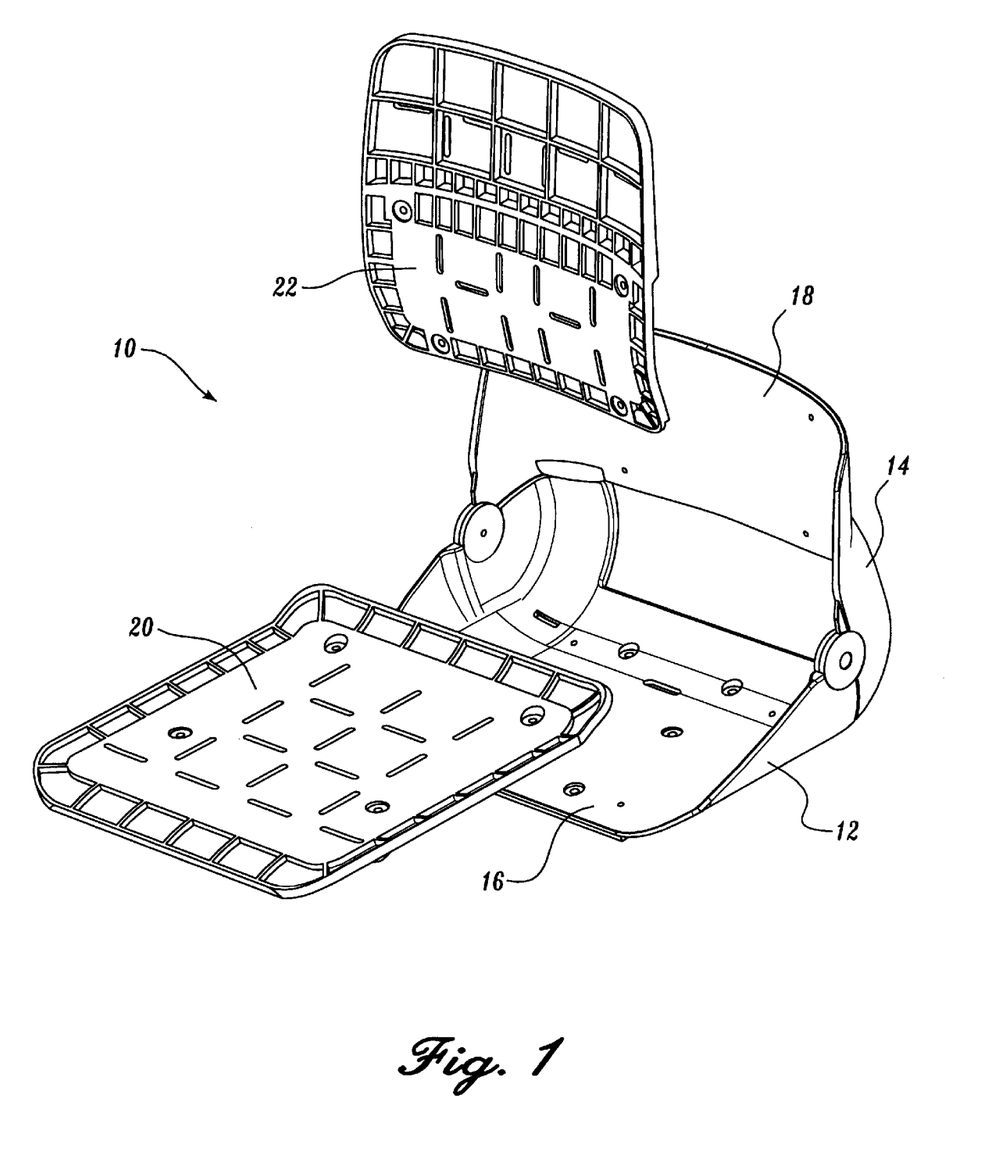
FIG. 1 is a perspective view of a representative seat formed in accordance with the present invention with the seat back in a vertical position.

Referring to FIG. 1, a seat indicated generally by reference numeral 10 formed in accordance with the present invention includes a seat base 12 and a seat back 14 displaceable between an upright unfolded position and a horizontal folded position. Seat base 12 includes a substantially horizontal base surface 16, and seat back 14 includes back surface 18. Foldable seat 10 optionally includes removable seat base panel 20 and/or removable seat back panel 22.

Figure 2A:
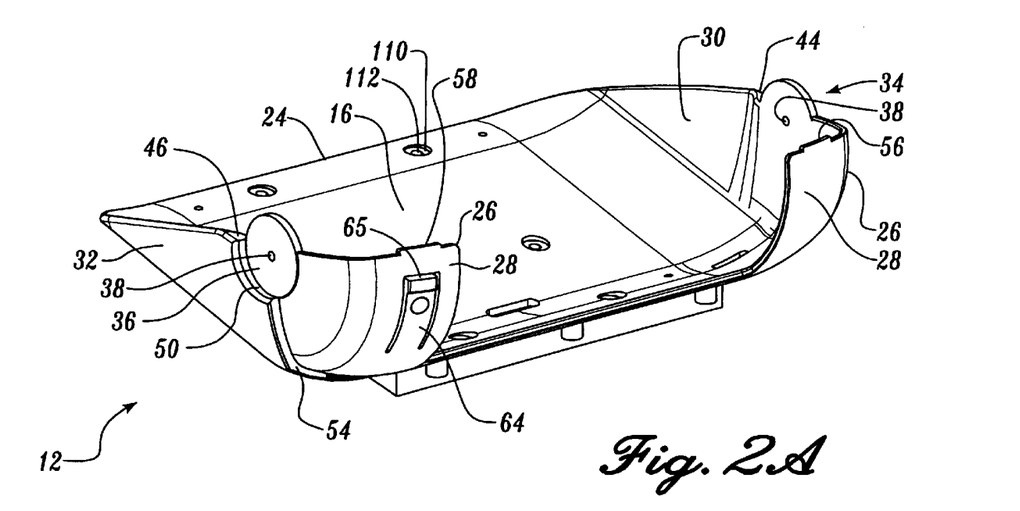
FIG. 2A is a perspective view of the top of a seat base of a representative seat formed in accordance with the present invention.

Generally, the seat base includes a substantially horizontal surface having a downwardly extending front end, an upwardly extending back wall, and substantially vertical sidewalls that include hinge-bearing surfaces. Referring to FIG. 2A, seat base 12 includes a substantially horizontal base surface 16 having a downwardly extending front end 24 and an upwardly extending back wall 26 having rear facing surface 28. The left and right edges of the seat base 12 include upwardly extending left sidewall 30 and right sidewall 32. The distance that each sidewall 30 and 32 extends above base surface 16 increases from the front of base surface 16 to the rear of base surface 16. Sidewalls 30 and 32 are generally perpendicular to base surface 16. The transition from left and right sidewalls 30 and 32 to base surface 16 forms a generally smooth arcuate surface. The rear of vertical sidewalls 30 and 32 directly adjacent upwardly extending back wall 26 includes vertically extending hinge-bearing surfaces, left and right flanges 34 and 36. Flanges 34 and 36 are substantially circular in shape and are taller than sidewalls 30 and 32 and extend upward to a height substantially equal to the height of the left and right sides of back wall 26. The rear ends of vertical sidewalls 30 and 32, below flanges 34 and 36, meet with the elevated left and right sides of upwardly extending back wall 26 to form a smooth arcuate transition surface. Flanges 34 and 36 lie in the same plane as vertical sidewalls 30 and 32, and form an approximately 90° angle with back wall 26. At the center of each circular flange 34 and 36 is an aperture 38 for receiving left and right hinge pins that hingedly attach seat base 12 to seat back 14, as described below in more detail.

In one embodiment, the height of back wall 26 across its length is substantially uniform. In a preferred embodiment, shown in FIGS. 2A and 2B, the middle portion of back wall 26 includes a section that has a height less than the height of the left and right sides of back wall 26, which provides a cutout portion between the left and right sidewalls of back wall 26.

Figure 3:
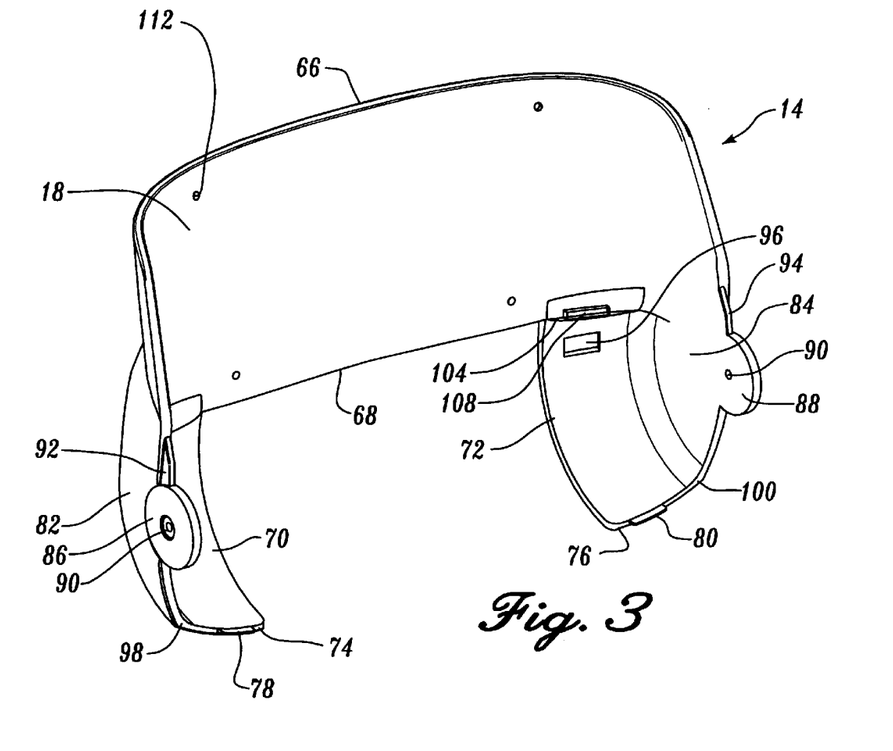
FIG. 3 is a perspective view of a seat back of a representative seat formed in accordance with the present invention.

The top edge of vertical sidewalls 30 and 32 flares to inwardly protruding shoulders 44 and 46, respectively, at flanges 34 and 36, respectively. Seat base 12 includes left flange surface (not shown in the perspective view of FIG. 2A) and right flange surface 50 against which rest flanges 86 and 88 of seat back 14, as shown in FIG. 3 and described below, when seat back 14 is hingedly attached to seat base 12. Seat base 12 further includes left and right rear facing vertical surfaces 52 and 54, which bear against the forward facing vertical surfaces 98 and 100, respectively, of seat back 14, as shown in FIG. 3 and described below, when seat back 14 is in its full upright position. The abutment of seat base rear facing vertical surfaces 52 and 54 and seat back forward facing vertical surfaces 98 and 100 is sufficient to prevent seat back 14 from rotating past the vertical position.

Figure 2B:
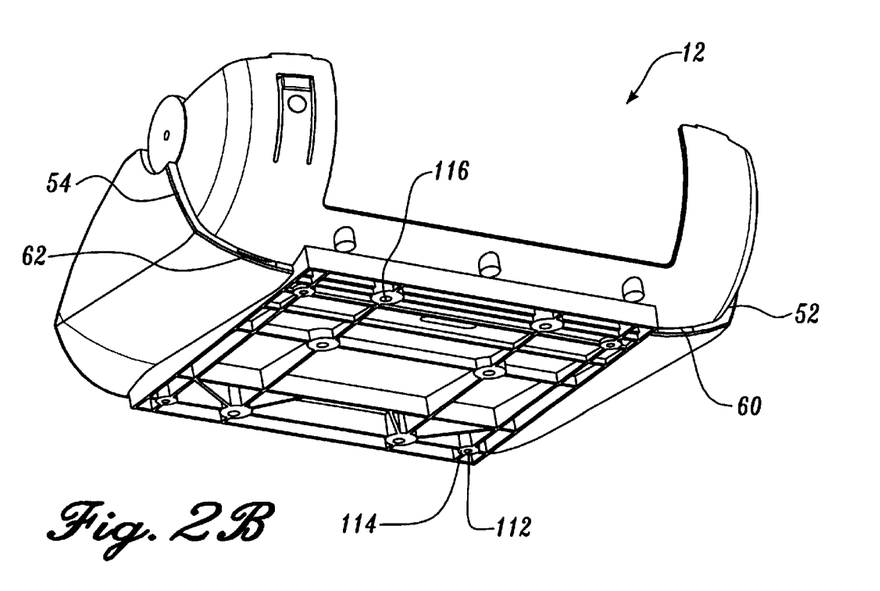
FIG. 2B is a perspective view of the bottom of a seat base of a representative seat formed in accordance with the present invention.

In a preferred embodiment, the top edge of seat base back wall 26 includes upwardly extending left and right insertion tabs 56 and 58, respectively. When seat back 14 is in its full upright position, tabs 56 and 58 insert into seat base receiving slots 108, respectively, as shown in FIG. 3 and described below. Referring to FIG. 2B, in another preferred embodiment, the rear facing vertical surfaces 52 and 54 of seat base 12 include left and right seat back receiving slots 60 and 62. When seat back 14 is in its full upright position, seat back insertion tabs 78 and 80, as shown in FIG. 3 and described below, insert into receiving slots 60 and 62, respectively. It has been found that, although the abutment of seat base rear facing vertical surfaces 52 and 54 and seat back forward facing vertical surfaces 98 and 100 is sufficient to prevent seat back 14 from rotating past the vertical position under normal load conditions, under excessive load conditions where, for example, the user leans back with great force, these surfaces can be deflected out of alignment with each other, and seat back 14 may rotate beyond vertical. The insertion of seat base tabs 56 and 58 into seat back slots 106 and 108, and seat back tabs 78 and 80 into seat base slots 60 and 62, further stabilizes the abutment of seat back 14 and seat base 12 and further reduces the likelihood of deflection out of alignment of seat base back wall 26 and seat back surface 18.

In a preferred embodiment, seat base back wall 26 also includes spring lock 64, which serves to lock seat back 14 in a substantially horizontal, folded position. Lock 64 springs outwardly from seat base 12 back wall 26 and automatically locks seat back 14 in a folded position when the lowermost end of the seat back slides upwardly along the rear facing surface 28 of back wall 26 to a position above the top surface 65 of lock 64. In the locked position, top surface 65 of lock 64 bears against a portion of seat back forward facing surface 100, thereby holding the seat back in a folded and locked position. The application of pressure to lock 64 deflects the lock into its unlocked position and allows seat back 14 to freely slide over depressed lock 64 and downwardly along rear facing surface 28 of back wall 26 and ultimately into an upright and vertical position. When seat back 14 is in its full upright and vertical position, spring lock 64 relaxes into relief recess 96 of seat back 14, as shown in FIG. 3 and described below.

Generally, the seat back includes, when in its upright and unfolded position, a substantially vertical upper surface and a downwardly and forwardly extending lower portion that includes substantially vertical sidewalls having hinge-bearing surfaces. Referring to FIG. 3, seat back 14 includes back surface 18 having an upper end 66 and a lower end 68, and a downwardly and forwardly extending lower portion. In one embodiment, the lower portion extends downwardly substantially uniformly across its length to a lowermost end.

In a preferred embodiment, shown in FIG. 3, the lower portion includes left and right lower walls 70 and 72 that extend below back surface 18 lower end 68 to left and right lowermost ends 74 and 76, respectively. The resulting cutout between lower walls 70 and 72 coincides with the cutout in the upwardly extending back wall 26 of seat base 12 when the seat back is in its upright position.

Lower walls 70 and 72 extend from back surface 18 lower end 68 to lowermost ends 74 and 76, respectively. Immediately below back surface lower end 68, lower walls 70 and 72 include forwardly extending left and right sidewalls 82 and 84, respectively. Sidewalls 82 and 84 include left and right flanges 86 and 88, respectively. Sidewalls 82 and 84 meet with the left and right sides of downwardly and forwardly extending lower walls 70 and 72, respectively, to form smooth and arcuate transition surfaces. Flanges 86 and 88 lie in the same plane as sidewalls 82 and 84, and form an approximately 90° angle with back surface 18. Flanges 86 and 88 are substantially circular in shape, and at the center of each is an aperture 90 for receiving left and right hinge pins. When seat base 12 is hingedly attached to seat back 14, the inner surfaces of seat back flanges 86 and 88 overlie the outer surfaces of seat base flanges 34 and 36, respectively. When seat base 12 is fixed horizontally, seat back 14 can be folded from an upright vertical position to a folded, horizontal position, or vice versa.

As noted above, the left and right edges of back surface 18 extend downwardly toward flanges 86 and 88, respectively, and include edge segments 92 and 94, respectively. When seat back 14 is in its substantially horizontal and folded position, seat back edge segments 92 and 94 rest against seat base shoulders 44 and 46, respectively.

In a preferred embodiment, seat back 14 further includes lock relief recess 96 positioned in seat back 14 to coincide with spring lock 64 of seat base 12 when the seat back is in its full upright and vertical position.

In its upright position, seat back surface 18 from upper end 66 to lower end 68 is a substantially vertical surface. Lower walls 70 and 72 of seat back 14 extend downwardly and forwardly from seat back lower end 68 to lowermost ends 74 and 76, respectively, and terminate with forward facing vertical surfaces 98 and 100, respectively. Forward facing surfaces 98 and 100 are substantially parallel to back surface 18. In a preferred embodiment, surfaces 98 and 100 include forwardly extending left and right insertion tabs 78 and 80, respectively. At back surface lower end 68, seat back 14 further includes left and right shoulders 102 (not shown in the perspective view of FIG. 3) and 104 that include insertion tab receiving slots 106 108, respectively. When seat back 14 is hingedly attached to seat base 12 and the seat back is in its upright vertical position, seat base tabs 56 and 58 insert into seat back slots 106 and 108, respectively, and seat back tabs 78 and 80 insert into seat base slots 108, respectively, thereby interlocking seat back 14 with seat base 12.

Accordingly, in one embodiment, a seat formed in accordance with the present invention includes a means for interlocking the seat base and back. Although the tab and slot means described above is a preferred interlocking means, it will be appreciated that other interlocking means are also within the scope of the present invention. For example, the seat base and seat back bearing surfaces (e.g., surfaces 52, 54, top edge back wall 26, surfaces 98, 100, and shoulders 102, 104) may be sloped in a complementary manner so as to provide an interlock.

When seat back 14 is in its vertical and upright position, shoulders 102 and 104 of seat back 14 bear against the top edge of seat base back wall 26, and, as noted above, forward facing surfaces 98 and 100 of seat back 14 bear against portions of rear facing surfaces 52 and 54 of seat base 12. When the seat is in its full unfolded position (i.e., when the seat back is in its full upright and vertical position), forward facing surfaces of lower walls 70 and 72 substantially fully overlie rear facing surface 28 of back wall 26. When the seat is in its fully folded and locked position, forward facing surfaces at lower walls 70 and 72 partially overlie rear facing surface of back wall 26. In other words, when the seat is in its fully folded and locked position (i.e., seat back 14 is substantially horizontal), seat back lower walls 70 and 72 lowermost ends 74 and 76 remain below the top edge of the seat base's back wall 26. For embodiments of the foldable seat where the lower wall extends downwardly substantially uniformly across its length to its lowermost end, the forward facing surface of the seat back lower wall substantially overlies the rear facing surface of the seat base back wall when the seat back is in its full upright and unfolded position, and the forward facing surface partially overlies the rear facing surface when the seat back is in its fully folded and locked position. The continuous overlay of seat back 14 with seat base 12 throughout the foldable seat's full range of motion (i.e., from fully folded to fully unfolded positions) avoids any possibility of pinching a finger or catching clothing when unfolding the seat of the present invention.

Figure 4:
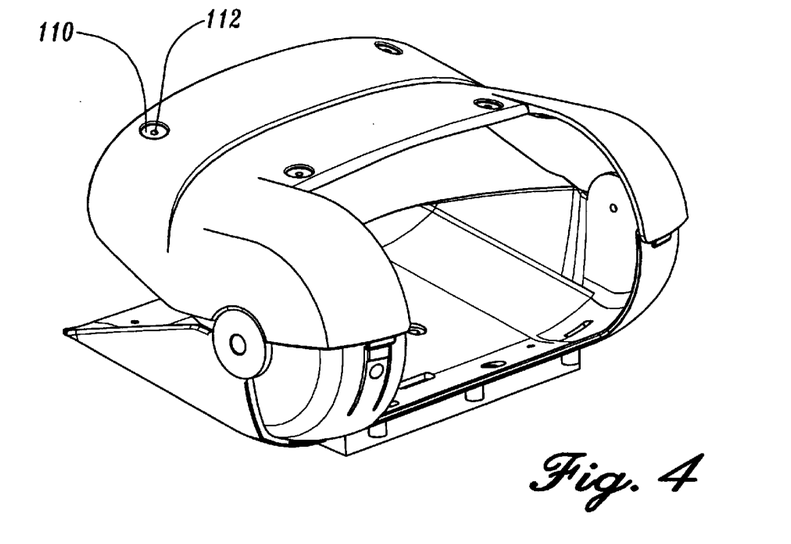
FIG. 4 is a perspective view of a representative seat formed in accordance with the present invention with the seat back in a horizontal folded position.

FIG. 4 shows a representative seat of the present invention with the seat back in a horizontal folded and locked position, and illustrates the continuous overlay of seat back 14 with seat base 12.

As described above, a seat formed in accordance with the present invention has a continuous overlay of the lower wall of the seat back and the back wall of the seat base. When the seat is fully unfolded, the seat back lower wall substantially fully overlies the seat base back wall. The overlay of the seat back and seat base provides a seat having a double wall that is substantially quarter-cylindrawings,ical in shape. The double wall resulting from the overlay provides the seat with a structural element that enhances its strength. In a preferred embodiment, a seat of this invention is designed such that the seat back forward facing surface overlies the seat base rear facing surface. It will be appreciated that a seat designed such that the seat back rear facing surface overlies the seat base forward facing surface is also within the scope of this invention.

The seat of the present invention can be an upholstered seat. In one embodiment, the seat back and/or seat base of the seat of the present invention is upholstered. In another embodiment, the seat of the invention includes a removable seat base panel and/or a removable seat back panel that can be readily upholstered. For an embodiment of the seat having a seat base panel, the panel is attached to the seat base. For an embodiment of the seat of the invention having a seat back panel, the panel is attached to the seat back. Accordingly, in one embodiment the seat base includes a means for attaching a removable panel, and in another embodiment, the seat back includes a means for attaching a removable panel. The removable panels may be attached to the seat of the present invention by any one of a number of fastening means including, for example, bolts, pins, screws, rivets, and the like. In a preferred embodiment, either one or both of the panels are fastened to the foldable seat with bolts.

Referring to FIGS. 1, 2A, and 2B the upper surface of seat base 12 includes recesses 110 having apertures 112 to receive a fastening means such as, for example, a bolt, for attaching panel 20 to seat base 12. Referring to FIG. 2B, the lower surface of seat base 12 includes bosses 114 having apertures 112 for attaching the panel to the seat base. Referring to FIGS. 1 and 4, the back surface of seat back 14 includes recesses 110 having apertures 112 for fastening seat back panel 22 to seat back 14. Recesses 110 allow the fastening means, for example, bolts, to lie either flush or below the seat base or back surfaces.

The seat of the present invention may be mounted in position on any one of a number of surfaces. For example, seat 10 may be mounted on a pedestal on the deck of a boat. The seat may be attached to the pedestal in any one of a number of ways. In a preferred embodiment, the seat is fastened to a pedestal with bolts. Referring to FIG. 2B, in such an embodiment, the lower surface of seat base 12 includes mounting bosses 116 to receive fastening means to mount the seat on a pedestal.

As noted above, the seat of the invention optionally includes a removable seat base panel and/or removable seat back panel. Accordingly, referring to FIG. 1, in one embodiment, seat 10 includes, in addition to seat base 12 and seat back 14, seat base panel 20. In another embodiment, seat 10 includes, in addition to seat base 12 and seat back 14, seat back panel 22. In still another embodiment, seat 10 includes seat base 12, seat back 14, seat base panel 20, and seat back panel 22. When removed from the seat of the present invention, seat panels 20 and 22 are readily upholsterable, and facilitate the convenient upholstering of the foldable seat. In addition to providing an upholsterable surface, removable panels 20 and 22 include structural elements. When the attached panel extends beyond either the front end of the seat base or above the upper end of the seat back, the structural aspects of the panels provide strength to the seat as a whole.

Panels 20 and 22 can be readily removed from and attached to the seat of the invention. Panels 20 and 22 may be attached to the seat by any one of a number of fastening means. In a preferred embodiment, either one or both panels are fastened to the seat with bolts. Panels 20 and 22 may also take any one of a variety of forms and sizes. For example, seat base panel 20 may be of such a size and shape as to extend forwardly beyond seat base front end 24 and thereby overhang the seat base when the panel is attached to the seat. Alternatively, base panel 20 may be of a size such that seat base front end 24 extends beyond the front end of seat base 12. Likewise, seat back panel 22 may take any one of a number of sizes and shapes. Back panel 22 may, for example, extend above seat back upper end 66, thereby providing support to the upper back, shoulders, neck, and head of a person sitting in the chair. Alternatively, the upper end of seat back 14 may extend above back panel 22 when the panel is attached to the seat back. Accordingly, the removable panels are useful in converting a relatively compact seat to a relatively larger seat. In a preferred embodiment, the foldable seat of the present invention includes both seat base panel 20 and seat back panel 22, and preferably seat base panel 20 extends beyond seat base front end 24 and seat back panel 22 extends above seat back upper end 66.

Figure 5A:
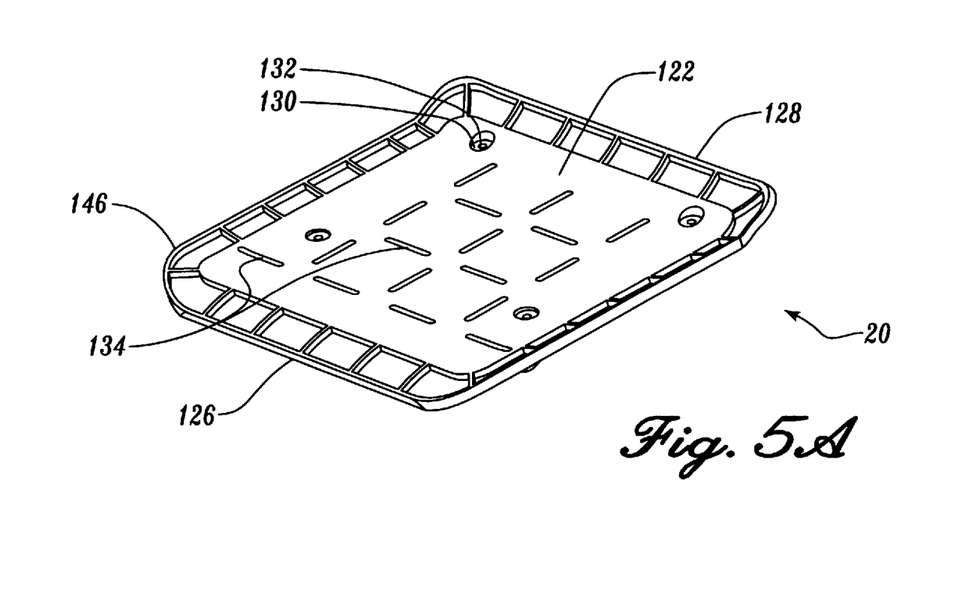
FIG. 5A is a perspective view of the top surface of a seat base panel of a representative seat formed in accordance with the present invention.
Figure 5B:
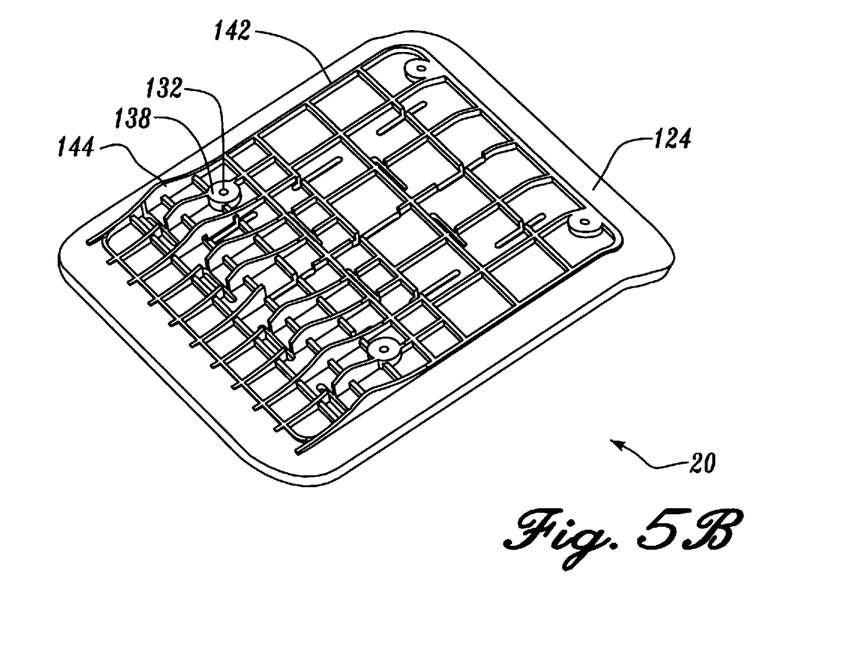
FIG. 5B is a perspective view of the bottom surface of a seat base panel of a representative seat formed in accordance with the present invention.

Generally, the removable seat base panel rests upon the seat base and has a means for attaching the panel to the seat base. Referring to FIGS. 5A and 5B, representative seat base panel 20 includes a top surface 122 and a bottom surface 124. Top surface 122 is a substantially flat surface having a downwardly extending front end 126 and an upwardly extending back end 128. As noted above, panel 20 is removably attachable to seat base 12 of the seat of the present invention. In a preferred embodiment, panel 20 is attached by fastening means, for example, bolts, to seat base 12. Referring to FIG. 2BA, in such an embodiment, top surface 122 includes recesses 130 having apertures 132 for receiving fastening means that serve to attach panel 20 to seat base 12.

Referring to FIG. 5B, bottom surface 124 includes ribs 142 that serve as structural support for panel 20. The nature and extent of such structural ribs are variable. Generally, the greater the number of ribs, the greater the structural support that the ribs provide. Similarly, the larger the rib, the greater the support the rib provides. In a preferred embodiment, any portion of seat base panel 20 that overhangs seat base 12 when the panel is attached to the seat base will preferably have enhanced structural ribs. Referring again to FIG. 5B, in one embodiment, panel 20 includes enhanced ribs 144. For the embodiment noted above where the base panel 20 is attached to seat base 12, bottom surface 124 includes bosses 138 having apertures 132 for receiving fastening means, for example, bolts, to attach the panel to the seat base. Referring to FIG. 2BB, ribbing 142 and 144 is elevated from bottom surface 124 such that the surface's perimeter lies below the ribbing surface. Such a design permits the attachment of upholstery to the bottom surface along its perimeter in a manner that does not interfere with the attachment of panel 20 to seat base 12. That is, base panel bosses 138 can rest directly against seat base 12 with upholstery attached to the seat base (i.e., the upholstery does not impede contact of the panel and seat base).

In a preferred embodiment, top surface 122 further includes ribbing 146 positioned along the perimeter of panel 20. The ribbing allows for the stapling of upholstery directly to the panel in such a manner that the staples securing the upholstery in place do not protrude above the top surface of the panel. Generally, the extent and positioning of ribbing 146 is variable and will generally depend on the nature of the desired upholstering. To further shape and secure upholstery to the panel, the base panel may optionally include additional slots. Such slots, including lister holes, permit straps of upholstery material to be passed through the panel and fastened. Accordingly, as shown in FIG. 5A, in a representative embodiment, panel 20 includes slots 134.

Figure 6A:
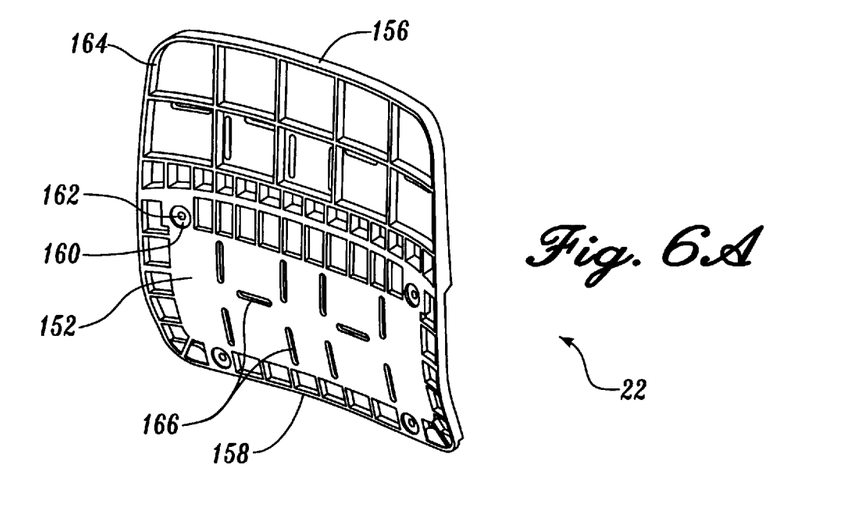
FIG. 6A is a perspective view of the front surface of a seat back panel of a representative seat formed in accordance with the present invention.
Figure 6B:
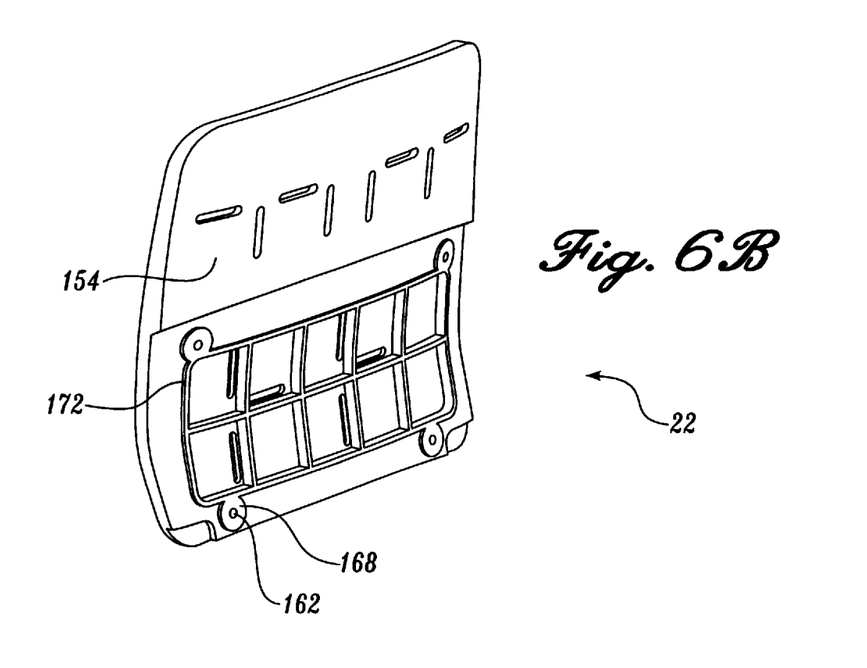
FIG. 6B is a perspective view of the back surface of a seat back panel of a representative seat formed in accordance with the present invention.

The removable seat back panel rests against the seat back and has a means for attaching the panel to the seat back. Referring to FIGS. 6A and 6B, representative seat back panel 22 includes a front surface 152 and a back surface 154. Referring to FIG. 6A, front surface 152 has a top end 156 and a bottom end 158. As noted above, seat back panel 22 is removably attachable to seat back 14 of the seat of this invention. In a preferred embodiment, panel 22 is attached with fastening means, for example, bolts, to seat back 14. Referring to FIG. 6A, in such an embodiment, panel 22 includes recesses 160 having apertures 162 for receiving fastening means, such as bolts, to attach panel 22 to seat back 14. Panel 22 also includes ribbing 164 that enables the stapling of upholstery directly to the panel in a manner such that the staples do not protrude to surface 152. The extent and positioning of ribbing 164 are variable and will generally depend on the desired ornamentality of the upholstering of the panel. Accordingly, the representative array of ribbing shown in FIG. 6A enables the creation of a variety of upholstery designs. Panel 22 may further include slots 166 for additional securing and design of the upholstered panel.

Referring to FIG. 6B, for additional structural support, in a preferred embodiment, back surface 154 further includes ribs 172. In a preferred embodiment, ribs 172 are positioned on the lower portion of back surface 154. Ribs 172 are elevated from the lower portion of back surface 154 such that the attachment of upholstery to the back surface along its lower perimeter does not interfere with the attachment of panel 22 to seat back 14. Back surface 154 includes bosses 168 having apertures 162 to receive fastening means, such as bolts, to attach panel 22 to seat back 14.

Figure 7:
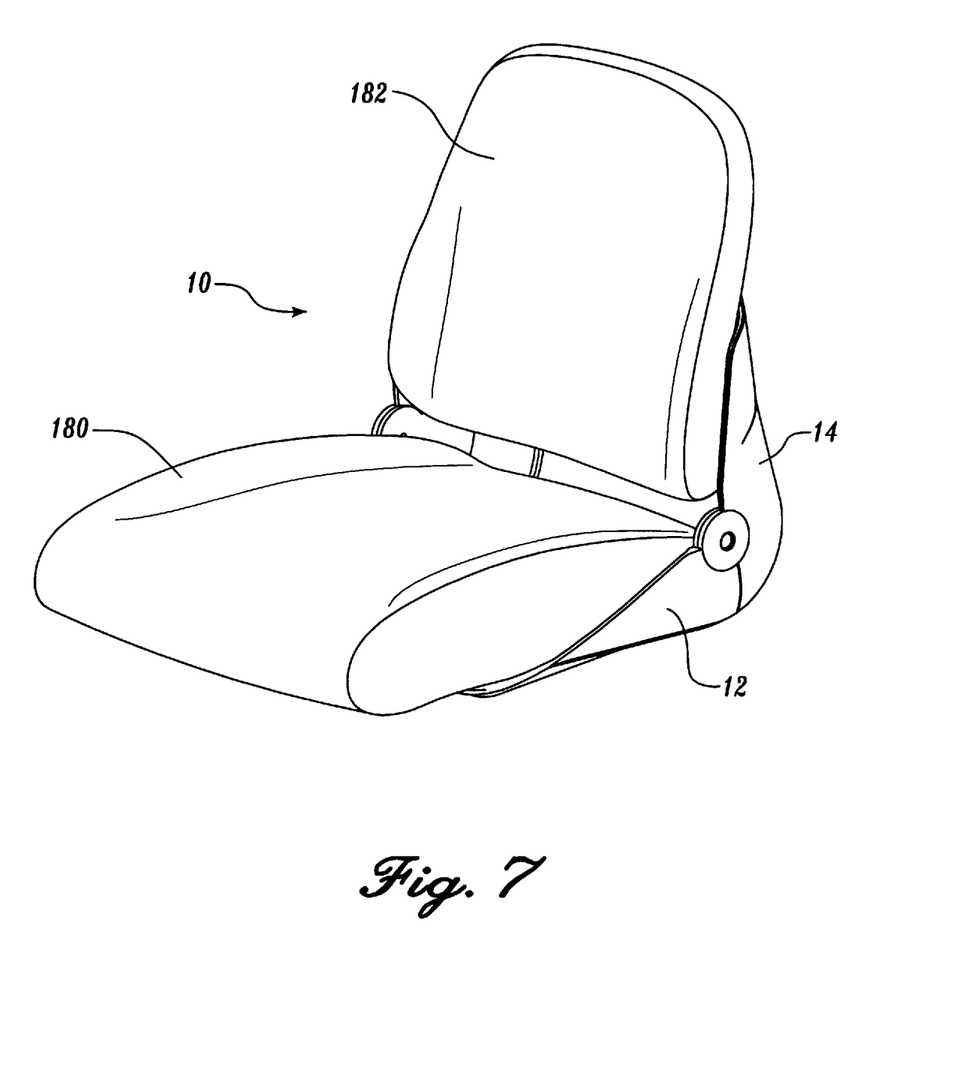
FIG. 7 is a perspective view of a representative seat formed in accordance with the present invention with upholstered removable panels.

As described above, in one embodiment, a seat formed in accordance with the present invention includes a seat base panel and/or a seat back panel. These removable panels are readily upholstered. An advantage of the seat of this invention is that an upholstered seat is directly provided when one or both removable upholstered panels are attached to the seat. Accordingly, in another embodiment, a seat formed in accordance with the present invention is an upholstered seat that includes a seat back affixed to a seat base and has an upholstered removable seat back panel and/or an upholstered removable seat base panel. In a preferred embodiment, the seat is a foldable seat having upholstered removable seat base and back panels as shown in FIG. 7. Referring to FIG. 7, in a preferred embodiment, seat 10 includes seat base 12, seat back 14, and upholstered removable seat base and seat back panels 180 and 182, respectively.

In one aspect, the present invention provides a seat including a seat base and seat back having a removable seat base and/or seat back panel. The removable, readily upholsterable panels can be directly attached to any seat generally having a seat base affixed to a seat back, including nonfoldable seats, and seats having additional features, for example, armrests. Accordingly, it will be appreciated that seats other than foldable seats and seats having features in addition to a seat base and a seat back, and that include a removable seat back panel and/or a removable seat base panel, are within the scope of this invention.

When seats formed in accordance with the present invention are to be used outside, it is preferred that the seat be molded from impact- and weather-resistant thermoplastic or thermoset polymers. The seat of the present invention can be manufactured by conventional molding techniques such as injection molding or casting.

While the preferred embodiment of the invention has been illustrated and described, it will be apparent that various changes can be made therein without departing from the spirit and scope of the invention.

The embodiments of the invention in which an exclusive property or privilege is claimed are defined as follows:

1. A seat comprising a seat back hingedly attached to a seat base and displaceable between a horizontal folded position and a vertical unfolded position, wherein the seat back comprises, when in a vertical position, a substantially vertical surface and a lower wall, the lower wall extending downwardly and then forwardly from the vertical surface when in a vertical position and terminating in a lowermost end, and the seat base comprises a substantially horizontal surface and a back wall, the back wall extending rearwardly and then upwardly from the horizontal surface and terminating in an upper edge, wherein the lower wall of the seat back substantially overlies the back wall of the seat base when the seat back is in the vertical position, wherein the lower wall of the seat back partially overlies the back wall of the seat base when the seat back is in the horizontal position, and wherein the lowermost end of the lower wall of the seat back remains below the upper edge of the back wall of the seat base throughout the seat back's full range of motion.

2. The seat of claim 1, further comprising a removable panel attached to the seat back.

3. The seat of claim 1, further comprising a removable panel attached to the seat base.

4. The seat of claim 3, further comprising a removable panel attached to the seat back.

5. A seat comprising a seat back hingedly attached to a seat base and displaceable between a horizontal folded position and a vertical unfolded position, wherein the seat back comprises, when in a vertical position, a substantially vertical surface and a lower wall having a forward facing surface, the lower wall extending downwardly and then forwardly from the vertical surface when in a vertical position and terminating in a lowermost end, and the seat base comprises a substantially horizontal surface and a back wall having a rear facing surface, the back wall extending rearwardly and then upwardly from the horizontal surface and terminating in an upper edge, wherein the forward facing surface of the seat back substantially overlies the rear facing surface of the seat base when the seat back is in the vertical position, wherein the forward facing surface of the seat back partially overlies the rear facing surface of the seat base when the seat back is in the horizontal position, and wherein the lowermost end of the lower wall of the seat back remains below the upper edge of the back wall of the seat base throughout the seat back's full range of motion.

6. The seat of claim 5, wherein the seat base further comprises means for attaching a removable panel.

7. The seat of claim 5, wherein the seat back further comprises means for attaching a removable panel.

8. The seat of claim 5, wherein the seat base further comprises a lock for securing the seat back in the horizontal folded position.

9. The seat of claim 5, wherein the back wall of the seat base further comprises a top edge having an upwardly extending tab, and wherein the lower wall of the seat back further comprises a shoulder having an upwardly extending receiving slot, the top edge and shoulder bearing on each other and the tab inserting into the slot when the seat back is in the vertical position.

10. The seat of claim 5, wherein the lower wall of the seat back further comprises a forward edge having a forwardly extending tab, and wherein the seat base further comprises a rear facing vertical surface having a forwardly extending receiving slot, the forward edge and rear facing vertical surface bearing on each other and the tab inserting into the slot when the seat back is in the vertical position.

11. A seat comprising a seat back hingedly attached to a seat base and displaceable between a horizontal folded position and a vertical unfolded position, and a removable panel, wherein the seat back comprises, when in a vertical position, a substantially vertical surface and a lower wall having a forward facing surface, the lower wall extending downwardly and then forwardly from the vertical surface when in a vertical position and terminating in a lowermost end, and the seat base comprises a substantially horizontal surface and a back wall having a rear facing surface, the back wall extending rearwardly and then upwardly from the horizontal surface and terminating in an upper edge, wherein the forward facing surface of the seat back substantially overlies the rear facing surface of the seat base when the seat back is in the vertical position, wherein the forward facing surface of the seat back partially overlies the rear facing surface of the seat base when the seat back is in the horizontal position, wherein the lowermost end of the lower wall of the seat back remains below the upper edge of the back wall of the seat base throughout the seat back's full range of motion, and wherein the removable panel is attached to the seat base.

12. The seat of claim 11, wherein the seat base further comprises a lock for securing the seat back in the horizontal folded position.

13. The seat of claim 11, wherein the back wall of the seat base further comprises a top edge having an upwardly extending tab, and wherein the lower wall of the seat back further comprises a shoulder having an upwardly extending receiving slot, the top edge and shoulder bearing on each other and the tab being inserted into the slot when the seat back is in the vertical position.

14. The seat of claim 11, wherein the lower wall of the seat back further comprises a forward edge having a forwardly extending tab, and wherein the seat base further comprises a rear facing vertical surface having a forwardly extending receiving slot, the forward edge and rear facing vertical surface bearing on each other and the tab inserting into the slot when the seat back is in the vertical position.

15. A seat comprising a seat back hingedly attached to a seat base and displaceable between a horizontal folded position and a vertical unfolded position, and a removable panel, wherein the seat back comprises, when in a vertical position, a substantially vertical surface and a lower wall having a forward facing surface, the lower wall extending downwardly and then forwardly from the vertical surface when in a vertical position and terminating in a lowermost end, and the seat base comprises a substantially horizontal surface and a back wall having a rear facing surface, the back wall extending rearwardly and then upwardly from the horizontal surface and terminating in an upper edge, wherein the forward facing surface of the seat back substantially overlies the rear facing surface of the seat base when the seat back is in the vertical position, wherein the forward facing surface of the seat back partially overlies the rear facing surface of the seat base when the seat back is in the horizontal position, wherein the lowermost end of the lower wall of the seat back remains below the upper edge of the back wall of the seat base throughout the seat back's full range of motion, and wherein the removable panel is attached to the seat back.

16. The seat of claim 15, wherein the seat base further comprises a lock for securing the seat back in the horizontal folded position.

17. The seat of claim 15, wherein the back wall of the seat base further comprises a top edge having an upwardly extending tab, and wherein the lower wall of the seat back further comprises a shoulder having an upwardly extending receiving slot, the top edge and shoulder bearing on each other and the tab inserting into the slot when the seat back is in the vertical position.

18. The seat of claim 15, wherein the lower wall of the seat back further comprises a forward edge having a forwardly extending tab, and wherein the seat base further comprises a rear facing vertical surface having a forwardly extending receiving slot, the forward edge and rear facing vertical surface bearing on each other and the tab inserting into the slot when the seat back is in the vertical position.

19. A seat comprising a seat back hingedly attached to a seat base and displaceable between a horizontal folded position and a vertical unfolded position, wherein the seat back comprises, when in a vertical position, a substantially vertical surface and a lower wall having a forward facing surface, the lower wall extending downwardly and then forwardly from the vertical surface when in a vertical position and terminating in a lowermost end, and the seat base comprises a substantially horizontal surface and a back wall having a rear facing surface, the back wall extending rearwardly and then upwardly from the horizontal surface and terminating in an upper edge, wherein the forward facing surface of the seat back substantially overlies the rear facing surface of the seat base when the seat back is in the vertical position, wherein the forward facing surface of the seat back partially overlies the rear facing surface of the seat base when the seat back is in the horizontal position, wherein the lowermost end of the lower wall of the seat back remains below the upper edge of the back wall of the seat base throughout the seat back's full range of motion, wherein a removable panel is attached to the seat base, and wherein a removable panel is attached to the seat back.

20. The seat of claim 19, wherein the seat base further comprises a lock for securing the seat back in the horizontal folded position.

21. The seat of claim 19, wherein the back wall of the seat base further comprises a top edge having an upwardly extending tab, and wherein the lower wall of the seat back further comprises a shoulder having an upwardly extending receiving slot, the top edge and shoulder bearing on each other and the tab inserting into the slot when the seat back is in the vertical position.

22. The seat of claim 19, wherein the lower wall of the seat back further comprises a forward edge having a forwardly extending tab, and wherein the seat base further comprises a rear facing vertical surface having a forwardly extending receiving slot, the forward edge and rear facing vertical surface bearing on each other and the tab inserting into the slot when the seat back is in the vertical position.

23. The seat of claim 19, wherein the removable panel attached to the seat base and the removable panel attached to the seat back are upholstered panels.

* * * * *